US009857804B2

(12) United States Patent
Isom et al.

(10) Patent No.: US 9,857,804 B2
(45) Date of Patent: Jan. 2, 2018

(54) METHOD AND SYSTEM FOR OPTIMIZING ACETYLENE DELIVERY

(71) Applicants: Wendell W. Isom, Grand Island, NY (US); Carl J. Cantrelle, Jr., Ama, LA (US); Razzack Syed, Mississauga (CA)

(72) Inventors: Wendell W. Isom, Grand Island, NY (US); Carl J. Cantrelle, Jr., Ama, LA (US); Razzack Syed, Mississauga (CA)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 106 days.

(21) Appl. No.: 14/757,396

(22) Filed: Dec. 23, 2015

(65) Prior Publication Data

US 2017/0185093 A1 Jun. 29, 2017

(51) Int. Cl.
*G05D 16/00* (2006.01)
*F17C 11/00* (2006.01)

(52) U.S. Cl.
CPC ............ *G05D 16/00* (2013.01); *F17C 11/002* (2013.01)

(58) Field of Classification Search
CPC ..... B65B 31/00; B65B 31/003; F17C 11/002; F17C 13/002
USPC ........ 141/3, 20; 137/819, 820; 585/820, 899
See application file for complete search history.

(56) References Cited

U.S. PATENT DOCUMENTS 4,341,234 A 7/1982 Meinass et al.
4,349,463 A 9/1982 Flanigen
4,542,774 A * 9/1985 Stavlo .................. B60P 3/2265 141/1
4,582,100 A 4/1986 Poulsen
4,657,055 A * 4/1987 Poulsen .................. F17C 5/005 141/83
4,863,493 A 9/1989 Kotani et al.
5,029,622 A * 7/1991 Mutter .................... F17C 5/007 137/79
5,139,057 A * 8/1992 Benedetti ................ F17C 5/005 141/18
5,284,630 A 2/1994 Bunger et al.
5,603,360 A * 2/1997 Teel .......................... F17C 5/06 137/267
5,884,675 A * 3/1999 Krasnov .................. F17C 5/06 141/18

(Continued)

FOREIGN PATENT DOCUMENTS

DE 4308801 A1 9/1994
DE 4337066 A1 5/1995

OTHER PUBLICATIONS

Author Unknown, "Acetylene Cylinders", *American Welding Society,* Miami, FL, XP-000768608, US, vol. 77, No. 1 (Jan. 1, 1998) p. 66.

*Primary Examiner* — Timothy L Maust
(74) *Attorney, Agent, or Firm* — Nilay S. Dalal

(57) ABSTRACT

This invention relates to a method and system for increasing the utilization of the supply of acetylene from two acetylene sources. The flow is provided at a substantially constant delivery pressure to a point of use, such as a customer point of use. A portable apparatus is configured to operably connect to each of the two acetylene sources simultaneously and during operation automatically provide flow from one of the acetylene sources through various valving and piping assembled onto the portable apparatus followed by supply to a customer point of use.

16 Claims, 5 Drawing Sheets

(56) References Cited

U.S. PATENT DOCUMENTS

| | | | | |
|---|---|---|---|---|
| 6,006,797 | A * | 12/1999 | Bulow | C10L 3/02 141/20 |
| 6,365,792 | B1 | 4/2002 | Stapf et al. | |
| 6,655,422 | B2 * | 12/2003 | Shock | B65B 31/00 141/1 |
| 6,953,068 | B2 * | 10/2005 | Hord, III | F17C 11/002 141/18 |
| 7,415,995 | B2 * | 8/2008 | Plummer | F17C 6/00 141/192 |
| 8,119,853 | B2 * | 2/2012 | Huang | F17C 11/002 141/20 |
| 8,129,577 | B2 * | 3/2012 | Maykut | C07C 7/09 141/20 |
| 8,322,383 | B2 | 12/2012 | Song et al. | |
| 8,453,682 | B2 * | 6/2013 | Bonner | F17C 5/06 137/113 |
| 9,022,246 | B2 * | 5/2015 | Coors | F17C 1/12 220/586 |
| 9,630,895 | B2 * | 4/2017 | Sturm | B01D 53/02 |
| 2002/0129867 | A1 * | 9/2002 | Krasnov | F17C 5/007 141/11 |
| 2005/0016831 | A1 | 1/2005 | Paganessi et al. | |
| 2009/0151809 | A1 * | 6/2009 | Balasubramanian | F17C 5/007 141/3 |
| 2009/0182180 | A1 | 7/2009 | Huang et al. | |
| 2009/0236006 | A1 * | 9/2009 | Farese | F17C 5/007 141/3 |
| 2012/0118763 | A1 | 5/2012 | Maykut et al. | |
| 2012/0318403 | A1 * | 12/2012 | Cohen | F17C 7/02 141/3 |
| 2013/0213521 | A1 | 8/2013 | Isom et al. | |
| 2014/0290791 | A1 | 10/2014 | Isom et al. | |

* cited by examiner

METHOD AND SYSTEM FOR OPTIMIZING ACETYLENE DELIVERY

FIELD OF THE INVENTION

This invention relates to a unique method and system for delivery of acetylene from any multiple trailer combination, or primary trailer-reserve bank configuration, to a point of use at a constant delivery pressure without significant interruption in supply.

BACKGROUND OF THE INVENTION

There are many operations that utilize large amounts of acetylene, making the use of a single cylinder at a time impractical. In these instances, as an alternative, several cylinders can be interconnected and used in combination with a manifold to provide a constant source of acetylene to an operation. A conventional arrangement involves cylinders that are delivered to the worksite or customer point of use where they are interconnected together with a manifold. Equipment may be utilized to regulate the delivery of acetylene to a point of use. However, such a manifold of cylinders contains numerous drawbacks. For example, the supply of acetylene can be interrupted due to delays in switching from an empty acetylene source to a fresh acetylene source. Additionally, there is generally a lack of proper monitoring means for ensuring when the acetylene supply system has deviated from preset operational limits. Still further, the cylinders generally have to be transported to a refilling station when the delivery pressure drops below a predetermined set point.

More recently, in an attempt to more effectively supply larger amounts of acetylene in comparison to cylinders which are interconnected by a manifold, multiple cylinders have been arranged on a trailer and then used at a site while remaining on the trailer. Such an approach eliminates the unloading and reloading of the cylinders at the point of use, thereby making it easier to replace empty cylinders with filled cylinders. However, such acetylene trailer arrangements still suffer numerous drawbacks, including interruptions in supply of acetylene to the point of use as a result of delays occurring during switchover from an empty trailer to a new trailer. Additionally, conventional acetylene trailer systems continue to lack proper monitoring means for ensuring when the acetylene supply system has deviated from preset operational limits.

Interrupted supply of acetylene typically leads to significant downtime, production costs and unacceptable reduction in throughput. In view of such drawbacks, there is a need for improved acetylene supply systems.

SUMMARY OF THE INVENTION

This invention in one aspect relates to a portable skid-mounted apparatus that includes valving, conduit, pressure regulators, transmitters, status indicators and other equipment specifically tailored for safe and controlled acetylene flow at controlled delivery pressures not exceeding a predetermined level. The apparatus is compact and modular in design so that it can be readily transported to a customer site where it can then be installed to the customer acetylene sources. When one of the acetylene sources is detected to reach a minimum pressure state, a controller that is assembled onto the skid-mounted apparatus is configured to automatically switch to the other acetylene source to resume flow. The acetylene source is allowed to increase in temperature until the partial pressure of acetylene increases to a level that is sufficient to resume flow therefrom at the required delivery pressure. Flow resumes from the original acetylene source until the pressure in the source is reduced to a final value at which point the source is removed from operation. Remote alert notifications are provided to indicate a change in status of the acetylene sources. In this manner, increased utilization is provided form the acetylene sources and supply to a customer is substantially uninterrupted, method for preparing a pressure vessel for receiving high purity acetylene at elevated pressure, said method comprising:

In one aspect, a system for maximizing utilization of supply of acetylene at a substantially constant delivery pressure to a point of use, comprising: a first acetylene source and a second acetylene source; the first acetylene source characterized by an initial source pressure comprising a first set of cylinders manifolded together to provide the supply of acetylene at the substantially constant delivery pressure; the second acetylene source comprising a second set of cylinders manifolded together to provide the supply of acetylene at the substantially constant pressure; each of the first set and the second set of cylinders comprising a porous filler with solvent selected from the group consisting of dimethylformaldehyde (DMF), acetone and N-methylpyrrolidone (NMP) into which pressurized acetylene is absorbed; the first acetylene source and the second acetylene source operably connected to a portable apparatus, said portable apparatus, comprising: a discharge manifold in fluid communication to the first acetylene source and the second acetylene source; and a controller to maximize the supply of acetylene from the first acetylene source, the controller having as an input, the delivery pressure of the acetylene, and the controller configured to switch supply to the second acetylene source when the controller determines the initial source pressure from the first acetylene source decreases by no more than 80% of the initial source pressure, and further wherein the controller is configured to divert from the second acetylene source back to the first acetylene source to resume supply of acetylene from the first acetylene source when determining the pressure of the first acetylene source is greater than the delivery pressure.

In a second aspect, a method for remotely monitoring an acetylene source which attains a change in status to a remote unit, comprising: providing a controller configured to monitor process variable information of a first acetylene source and a second acetylene source, said process variable information selected from the group consisting of valve position status, initial source pressure, source pressure, flow rate, manifold pressure, pipeline pressure at the point of use, and temperature; said controller detecting when the first acetylene source has undergone the change in status between a minimum pressure state, a permanent or temporary depleted state and an online state; and transmitting in response to said change in the status an alert notification to a remote unit over a cellular network or cyber secure internet link.

In a third aspect, a process for optimizing acetylene supply to a point of use, comprising the steps of: directing a flow of acetylene from a first acetylene source at a predetermined delivery pressure, said first acetylene source characterized by a first initial source pressure; switching to the second acetylene source when a pressure of the first acetylene source has decreased by no greater than 80% of the first initial source pressure; directing flow from the second acetylene source; designating the first acetylene source in standby mode and allowing the pressure of the first acetylene source to increase to greater than 20% of the first initial source pressure; and diverting supply of acetylene to the first acetylene source when the pressure of the first acetylene source increases to greater than 20% of the first initial source pressure.

In a fourth aspect, a portable on-site apparatus configured for automatically controlling supply of acetylene from multiple acetylene trailers, said portable-onsite apparatus comprising: a discharge manifold, said manifold adapted to interconnect to at least a first acetylene source and a second acetylene source to allow the supply of acetylene at a substantially constant delivery pressure to a point of use from either the first acetylene source or the second acetylene source; a controller to maximize the supply of the acetylene from the first acetylene source, the controller having as an input, the delivery pressure of the acetylene, and the controller configured to switch supply from the first acetylene source to the second acetylene source when the controller determines a pressure of the first acetylene source decreases by no greater than 80% of an initial source pressure of the first acetylene source, and further wherein the controller is configured to divert from the second acetylene source to the first acetylene source to resume supply of acetylene from the first acetylene source when determining the pressure of the first acetylene source is sufficient to supply the acetylene at the substantially constant delivery pressure; a modular platform characterized by a footprint having an area of no more than about 50 ft2, said modular platform configured to receive said controller and said discharge manifold.

DETAILED DESCRIPTION OF THE INVENTION

Figure 1:
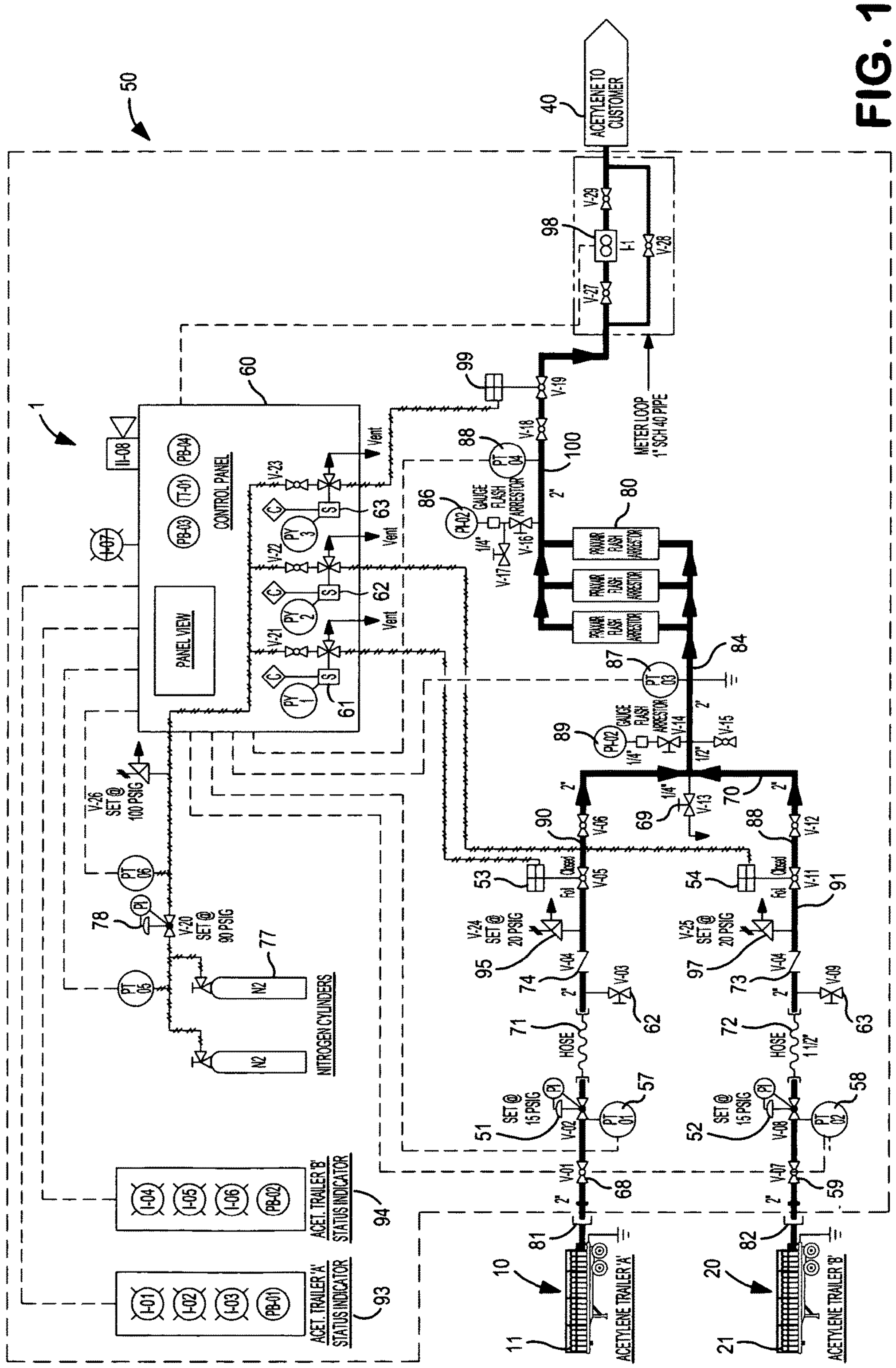
FIG. 1 is a process schematic that employs a skid-mounted apparatus for optimizing the supply of acetylene from two trailers at substantially constant delivery pressure to a customer point of use in accordance with the principles of the present invention.

As will be described, the present invention offers a transportable skid-mounted apparatus 50 that is designed to offer substantially uninterrupted acetylene supply to a point of use 40 while increasing acetylene utilization from the sources. The process 1 that incorporates the transportable skid-mounted apparatus 50 is flexible and eliminates the need to assemble acetylene supply systems at a point of use. Additionally, the process 1 optimizes the use of large amounts of compressed acetylene sources at the point of use 40.

In one aspect, and as will now be described with reference to FIG. 1, the present invention relates to a method and system for maximizing utilization of the supply of acetylene at a substantially constant delivery pressure to a customer point of use 40 from an acetylene source that includes a first trailer 10 and a second trailer 20. Other types of acetylene sources are contemplated by the present invention, including, by way of example, a reserve acetylene bank 401 that is configured to remain stationary at the customer site, as will be described in accordance with the embodiment of FIG. 4.

Referring to FIG. 1, the first trailer 10 may be a primary trailer that comprises a first set of cylinders 11 manifolded together to supply acetylene. The term "primary" as used herein and throughout refers to a primary or first acetylene source that is utilized to supply acetylene until reduced to a predetermined minimum pressure, at which point supply switches to a secondary acetylene source until the pressure of acetylene in the first acetylene source is detected to increase to a predetermined pressure via ambient heat and/or other suitable heating means. When the pressure in the primarily trailer has reached the predetermined pressure, the process 1 is designed to resume supply from the primary trailer until depleted to a final pressure. Upon reaching the final pressure, the primary acetylene source is disengaged and removed from the process 1, as will be described in greater detail. The second trailer 20 comprises a second set of cylinders 21 manifolded together to provide a secondary source of acetylene. The second trailer 20 may be a standby trailer that supplies acetylene when the primary acetylene trailer has been depleted to a particular pressure, as will be described in greater detail. The term "secondary" as used herein and throughout refers to an acetylene source that is utilized to provide back-up supply of acetylene while the primary acetylene source (e.g., first trailer 10) is allowed to increase in pressure to a predetermined level.

Because acetylene can decompose explosively into carbon and hydrogen under conditions of high pressure and temperature, even in the absence of air or oxygen, the acetylene cylinders as used herein are specifically prepared to avoid decomposition of acetylene. In particular, each of the first set and second set of cylinders 11 and 21, respectively, are prepared to contain porous filler with solvent distributed into the porous material. Solvent such as acetone, dimethylformamide (DMF) or N-methylpyrrolidone (NMP) can be employed. The porous filler is a porous mass generally having a certain porosity, such as, by way of example, a porosity of about 10-90% by volume; preferably about 30-90% by volume; and more preferably about 50-90% by volume. The porous filler allows the acetylene to be separated into small units in the pores that help to inhibit the decomposition of acetylene when stored within the first set and second set of cylinders 11 and 21, respectively. The solvent absorbs a sufficient amount of acetylene to enable high cylinder loading in the cylinders. DMF is preferably used as the solvent. One method for possible cylinder preparation for charging high purity acetylene is descried in U.S. Pat. No. 8,322,383, the contents of which are hereby incorporated by reference in their entirety. Other suitable methods for acetylene cylinder preparation as known in the art may also be employed.

After preparation of the first set of cylinders 11 and the second set of cylinders 21, acetylene may be charged therein. Methods for filling the first set of acetylene trailers 10 and the second set of acetylene cylinders 20 are described in U.S. Patent Publication Application Nos. 20130213521 and 20140290791, the contents of both which are hereby incorporated by reference in their entirety. Other suitable methods may also be utilized. Having filled the first set of cylinders 11 and the second set of cylinders 21, they can be loaded onto their first trailer 10 and second trailer 20, respectively, and thereafter transported to the customer point of use 40. The point of use 40 can also be a manufacturing process, a reservoir for storage, point of consumption, a gas transport infrastructure, a pipeline or any other location that requires compressed acetylene.

The first of set of cylinders 11 are loaded onto the first trailer 10, and the second set of cylinders 21 are loaded onto the second trailer 20. It should be understood that the loading of cylinders 11 and 21 onto trailers 10 and 20, respectively, can occur before or after acetylene charging into the first set of cylinders 11 and the second set of cylinders 21. The first set of cylinders 11 are preferably manifolded together in a parallel arrangement so that each of the first set of cylinders 11 is supplying acetylene during operation of the first trailer 10. Similarly, the second set of cylinders 21 are preferably manifolded together in a parallel arrangement so that each of the second set of cylinders 21 is supplying acetylene during operation of the second trailer 20. In a preferred embodiment, each of the first and second trailers 10 and 20 can hold approximately 200 cylinders that are manifolded together to give a total available volume of approximately 75,000 cubic ft. It should be understood that the first and second trailers 10 and 20 can be modified as known in the art to hold a higher number or lower number of cylinders as needed for a particular application.

In accordance with one aspect of the present invention, FIG. 1 illustrates a process 1 for acetylene delivery from a two trailer system that includes a first trailer 10 and a second trailer 20 configured to supply acetylene to a customer point of use 40. The trailers 10 and 20 are configured to supply acetylene to a customer point of use 40 through skid-mounted apparatus 50.

Figure 2:
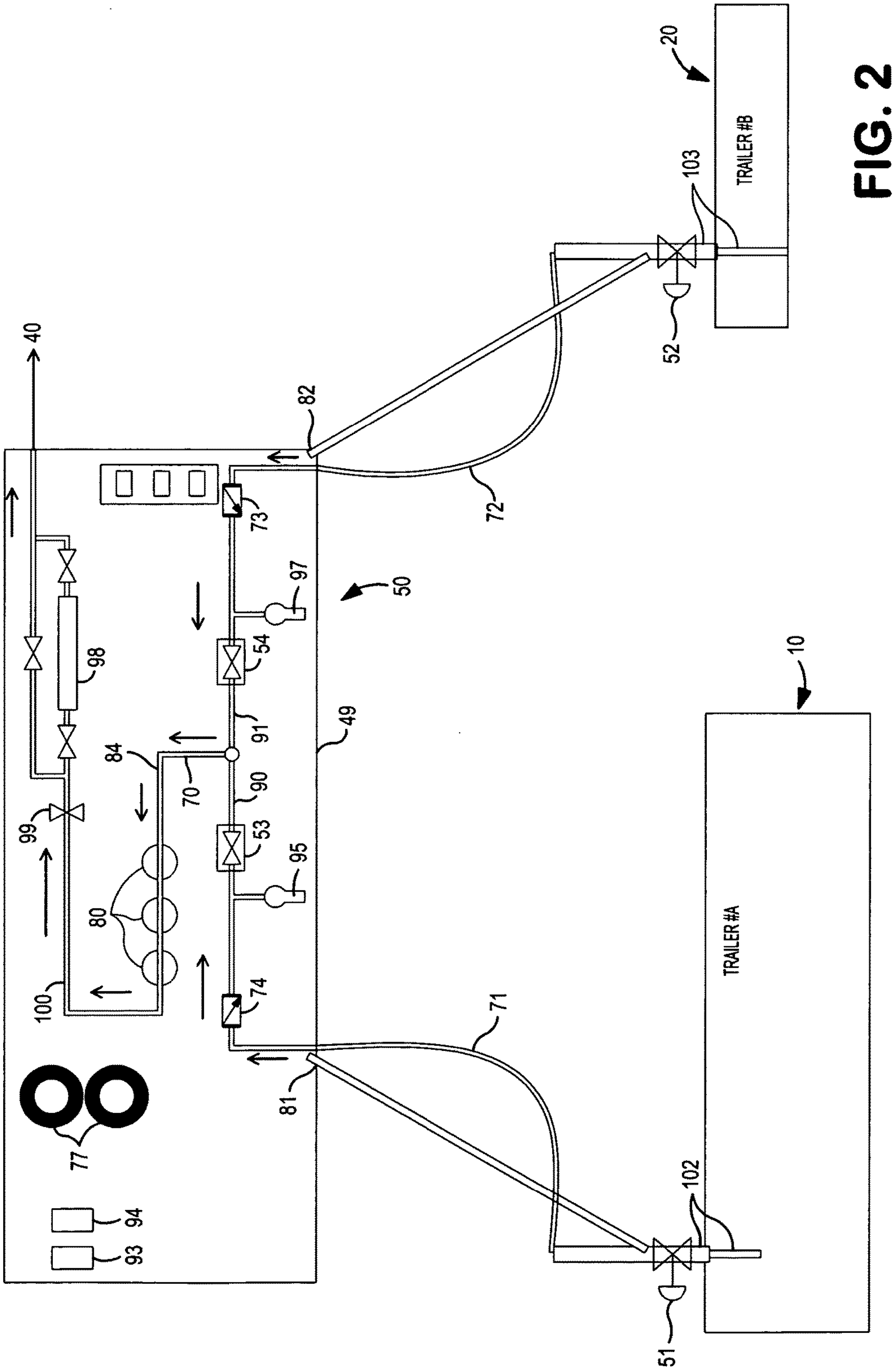
FIG. 2 shows a top-down view of the skid mounted apparatus of FIG. 1.

FIG. 1 indicates by dotted line the skid-mounted apparatus 50. It should be understood that FIG. 1 is not drawn to scale, and some features are intentionally omitted for purposes of clarity to better illustrate the principles of the present invention. In this regard, the skid-mounted apparatus 50 is intentionally shown to be larger in overall size compared to other components, including the first trailer 10 and the second trailer 20, for purposes of better conveying the operation of the various aspects of the present invention. The skid-mounted apparatus 50 is operably connected to the first trailer 10 at location 81 by a suitable connection 102 (FIG. 2) and operably connected to the second trailer 20 at location 82 by a suitable connection 103 (FIG. 2). Any suitable connection 102 and 103 may be utilized, including for example, a valve connection, such as a CPV union shutoff valve. Additionally, the process 1 may employ any suitable conduit or flow leg. As used herein and in the claims, the terms “conduit” and “flow leg” mean flow paths within the process 1 for delivery of acetylene that are formed by any conventional piping, hoses and the like.

The skid mounted apparatus 50 acts as a fluid conduit between the trailers 10 and 20 and the customer point of use 40 that is able to activate flow from either the first trailer 10 (labelled Acetylene Trailer A in FIG. 1) or the second trailer 20 (labelled Acetylene Trailer B in FIG. 1) as will be described. The skid-mounted apparatus 50 includes various components, including, but not limited to, a programmable logic controller (PLC) 60; pressure regulating devices 51 and 52; pressure transmitters 57 and 58; automatic control valves 53 and 54; a discharge manifold 70; pressure flash arrestors 80; nitrogen cylinders 77 attached to the platform 49 (FIG. 2); status indicators 93 and 94 for first and second acetylene trailers 10 and 20 respectively; delivery valves 68 and 59; control valve 99; and suitable conduit connecting the various components. The PLC 60 is preferably situated on the skid mounted apparatus 50. The PLC 60 controls the supply of acetylene from the first trailer 10 and the second trailer 20 in accordance with the principles of the present invention. The PLC 60 also controls the various valving, including automatic control valves 53 and 54 and pressure regulating devices 51 and 52. Dotted lines from control valves 53 and 54 to PLC 60 designate communication therebetween. Dotted lines from each of pressure transmitters 57, 58, 87 and 88 to PLC 60 also indicate communication therebetween. The apparatus 50 comprises a modular platform 49 (best seen in FIGS. 2 and 3) that preferably occupies a foot print of not more than about 50 ft2 based on a design of approximately 5 feet wide by 10 feet long. In a preferred embodiment, the foot print is not more than about 40 ft2, and more preferably about 30-35 ft2. The compactness of the skid-mounted apparatus 50 allows it to be transported to various customer points of use 40, where the apparatus 50 can be readily coupled to acetylene sources such as trailers 10 and 20. In this manner, the geometric design of the skid-mounted apparatus 50 provides a modular “plug and operate” capability for handling the delivery of acetylene from multiple acetylene sources in an optimized manner.

Referring to FIG. 1, the skid mounted platform 50 contains PLC 60 that initiates delivery of acetylene from the first trailer 10 by transmitting signals to one or more automatic control valves to be set in an open position along the first flow leg 90. The second trailer 20 is maintained off line in a standby mode. At start-up, status indicator 93 for the first trailer 10 is “on line” and the status indicator 94 for the second trailer 20 is indicated as “off line” or “standby”. With the first trailer 10 online, the valves corresponding to the cylinders 11I are set to the open position to allow acetylene to be discharged from each of the first set of cylinders 11 along the first flow leg 90. Preferably, for ease of operation, the cylinders 11 remain configured in the open position, even when off-line.

The PLC 60 preferably receives the delivery pressure as a user input. The PLC 60 sends a signal to activate control valve 53 to an open position; sends another signal to activate control valve 99 to an open position to enable acetylene flow from the skid mounted platform 50 to the customer point of use 40; and checks to ensure that control valve 54 is set in the closed position so that acetylene is not inadvertently flowing from the second set of cylinders 21 loaded on the acetylene trailer 20 into the second flow leg 91. If control valve 54 is in the open position, the PLC 60 sends a signal to activate control valve 54 into the closed position. Any suitable method can be employed by which the PLC activates the various control valves 53, 54 and 99 into either the open or closed position. One example is as follows. Nitrogen is withdrawn from cylinders 77 and is directed to a pressure regulator 78 which regulates the pressure of the nitrogen to 90 psi. Thereafter, the nitrogen is directed to one of the solenoid valves 61, 62 or 63 which are in parallel arrangement with one another. The exact solenoid valve 61, 62 or 63 to which nitrogen is directed depends on which control valve 53, 54 or 99 is to be activated. Solenoid valve 61 is in communication with control valve 53; solenoid valve 62 is in communication with control valve 54; and solenoid valve 63 is in communication with control valve 99. Each of the solenoid valves 61, 62 and 63 is controlled by the PLC 60; and each of the solenoid valves 61, 62 and 63 is energized, as nitrogen is supplied to a pneumatic positioner (not shown) corresponding to the control valve 53, 44 and 99. For example, when solenoid valve 61 is energized by a 4-20 mA signal, nitrogen from the cylinders 77 is directed to the pneumatic positioner of the control valve 53, thereby causing the control valve 53 to open and close. Control valves 54 and 99 in FIG. 1 are activated in a similar manner. This activation is merely one example that is intended to illustrate a representative method for activation of the control valves 53, 54 and 99 herein. It should be understood other suitable means for activating control valves 53, 54 and 99 may be utilized as known in the art.

Valves 68 and 59 are shown in FIG. 1 as manual valves that are turned to the open position by an operator or end-user. It should be understood that valve 68 and/or 59 and other manual valves in the process 1 may alternatively be configured as automatic control valves that are activated by the PLC 60 as described hereinbefore.

At least control valve 54 is set in the closed position along the second flow leg 91 to prevent flow from the second set of cylinders 21 of the second trailer 20 when the primary acetylene trailer 10 is on-line.

Having configured the valving of the first flow leg 90 to the open position and the appropriate valving of second flow leg 91 to the closed position so as to prevent flow from the secondary acetylene trailer 20, acetylene can be supplied from the first set of cylinders 11 of the primary trailer 10. As acetylene flows from each of the first set of cylinders 11 contained in the primary trailer 10 into the inlet 81 of skid mounted apparatus 50, pressure regulating device 51 regulates the pressure of acetylene from the initial source pressure in the manifolded first set of cylinders 11 (e.g., about 250 psig at start-up) to a predefined delivery pressure. In a preferred embodiment, the predefined delivery pressure is set to about, 10-40 psig, preferably 10-25 psig and more preferably about 15 psig. It should be understood that the present invention can also supply acetylene at other delivery pressures. The exact delivery pressure may be dependent upon several factors, including the pressure required by the customer at the customer point of use 40 for the specific application for which the acetylene is utilized (e.g., welding gas, heat treating gas or carburization gas applications).

Acetylene continues to flow through a hose 71 connected to the pressure regulating device 51 and thereafter through check valve 74, and control valve 53 along the first flow leg 90. Acetylene from the first set of cylinders 11 enters one side of a discharge manifold 70, which is a conduit that unites the first flow leg 90 with the second flow leg 91. A pressure transducer/transmitter 87 measures the pressure of acetylene flowing into the discharge manifold 70; and then relays the signal as an input to the PLC 60. The PLC 60 may adjust the pressure if necessary by, for example, adjusting the pressure regulating device 51 to ensure the pressure of acetylene along the first flow leg 90 is within acceptable tolerance limits of the delivery pressure required at the customer point of use 40 (e.g., a delivery pressure of 15 psig, plus or minus 1 psig). Thereafter, the acetylene flows along a third flow leg 84 extending into the flash arrestors 80. The flash arrestors 80 are a safety device designed to stop an acetylene flash. The flash arrestors 80 as shown in FIG. 1 are arranged in parallel and located between the first flow leg 90 and the outlet flow leg 100. The stream of acetylene flowing along third flow leg 84 is distributed into each flash arrestor 80. Pressure transducers (not shown) are situated on either side of the flash arrestors 80, and measure a differential pressure across the flash arrestors 80 that will shut down the process 1 if the differential pressure across the flash arrestors 80 reaches an established set point.

The acetylene emerges from the outlet of each of the flash arrestors 80, and then converges as a single stream that flows along the outlet flow leg 100. A pressure gauge 86 along the outlet flow leg 100 measures the pressure of the acetylene stream. FIG. 1 also shows a downstream pipeline pressure transmitter 88 which measures the pressure and relays a signal input to the PLC 60 to ensure the pressure of the acetylene stream is at the predetermined delivery pressure prior to the acetylene stream exiting from the outlet leg 100; exiting the skid 50 through the control valve 99 and a subsequent mass flow meter 98; and then supplied to the customer point of use 40. Although flow is not controlled in the embodiment of FIG. 1, the acetylene in accordance with one aspect of the present invention can be supplied at a substantially constant delivery pressure of 10-30 psig with a flow rate no greater than approximately 3000 standard cubic feet per hour (SCFH); preferably a substantially constant delivery pressure of 15-25 psig and a flow rate no greater than approximately 3000 SCFH; and more preferably 15 psig at a flow greater no greater than approximately 3000 SCFH.

Acetylene at substantially constant delivery pressure continues to be supplied in this manner from the first set of cylinders 11 of the primary trailer 10 until the source pressure of acetylene from the first set of cylinders 11 in the primary trailer 10 has reduced to a predetermined minimum pressure. In particular, this predetermined minimum pressure is defined as the source pressure of acetylene decreasing by no more than about 70% of its initial source pressure, preferably no more than about 75% of its initial source pressure, and more preferably no more than about 80% of its initial source pressure. It should be understood that the source pressure may be measured with a pressure gauge (not shown) or pressure transducer, either of which is preferably located within the respective manifolded regions at which the first set 11 of cylinders are interconnected. Other suitable means for measuring the pressure are also contemplated. The process 1 of FIG. 1 is designed and operated such that supply of acetylene from the first/primary trailer 10 does not occur below a source pressure that has been reduced to this predetermined minimum pressure. In particular, unlike conventional acetylene supply systems, the present invention has discovered that solvent carry-over or entrainment into the acetylene withdrawn from the first set of cylinders 11 may occur when the source pressure of acetylene in the cylinders 11 reduces below the predetermined minimum pressure, thereby undesirably introducing solvent impurities (e.g., dimethylformaldehyde (DMF), acetone and N-methylpyrrolidone (NMP)) into the acetylene that is withdrawn from the first set of cylinders 11. For example, when the source pressure of acetylene in the first set of cylinders 11 has decreased by a predetermined level of 80% or greater, it has been discovered by Applicants that the carry-over of solvent into the withdrawn acetylene can increase by approximately a factor of 10-50, which reduces the purity level of acetylene that is supplied to the customer point of use 40. As such, unlike conventional acetylene delivery sources, the present invention is directed to not only maintaining a substantially constant supply of acetylene with regards to delivery pressure, but also maintaining the purity of the acetylene supply by preventing the source pressure of the primary trailer 10 from dropping below a predetermined minimum pressure no more than about 70% of its initial source pressure, preferably no more than about 75% of its initial source pressure, and more preferably no more than about 80% of its initial source pressure. Accordingly, the process 1 has the ability to control the amount of carry-over solvent to minimize, reduce or eliminate the solvent contamination of the acetylene withdrawn from the first set of cylinders 11. A suitable chemical analyzer as known in the art may be incorporated into the process 1 to measure impurities of the acetylene along the first flow leg 90.

A switchover from the first trailer 10 to the second trailer occurs 20 when the source pressure of the first trailer 10 has reduced to this predetermined minimum pressure level. Specifically, and in a preferred aspect of the present invention, the pressure transmitter 57 along the first flow leg 90 measures the source pressure of the acetylene from the first trailer 10 to decrease from an initial source pressure of 250 psig to no more than about 50 psig, which represents a 80% decrease in pressure. In response thereto, pressure transmitter 57 sends a signal to the PLC 60, which then directs control valve 53 to be set in the closed position along the first flow leg 90; and directs control valve 54 to be set in the open position along the second flow leg 91. The PLC 60 may direct the other valves on the second flow leg 91 to be set to the open position if previously in a closed position. Alternatively, such other valves may remain open to minimize the number of valves required to be opened and closed during switchover of acetylene supply between the first trailer 10 to second trailer 20 and vice versa. Valves 59 and 88 are manually configured in the open position. Alternatively, the valves 59 and 88 may be configured by signals relayed from the PLC 60 to the valves 59 and 88 if the valves 59 and 88 are control valves.

The PLC 60 transmits a signal to status indicator 93 that changes the status indicator 93 for the first trailer 10 from "online" to "offline"; and the PLC 60 sends another signal to status indicator 94 that changes the status indicator 94 for the second trailer 20 from "offline" to "online". Additionally, the PLC 60 detects when the first acetylene trailer 10 has undergone the change in status between a minimum pressure state and an online state; and subsequently transmits an alert notification to a main central location and/or remote unit (e.g., cell phone, pager, computer) over a cellular network or cyber secure internet link indicating the first trailer 10 has changed status from an "online' mode to an "offline" or "minimum pressure" mode, as will be explained in greater detail with respect to the embodiment of FIG. 5. The remote alert notification may further indicate that the first trailer 10 is not to be removed from the process 1, but rather allowed a certain duration for the first set of cylinders 11 to absorb ambient heat and/or remain subject to suitable heating means sufficient to re-vaporize residual acetylene absorbed within the solvent, as will be described below.

Figure 3:
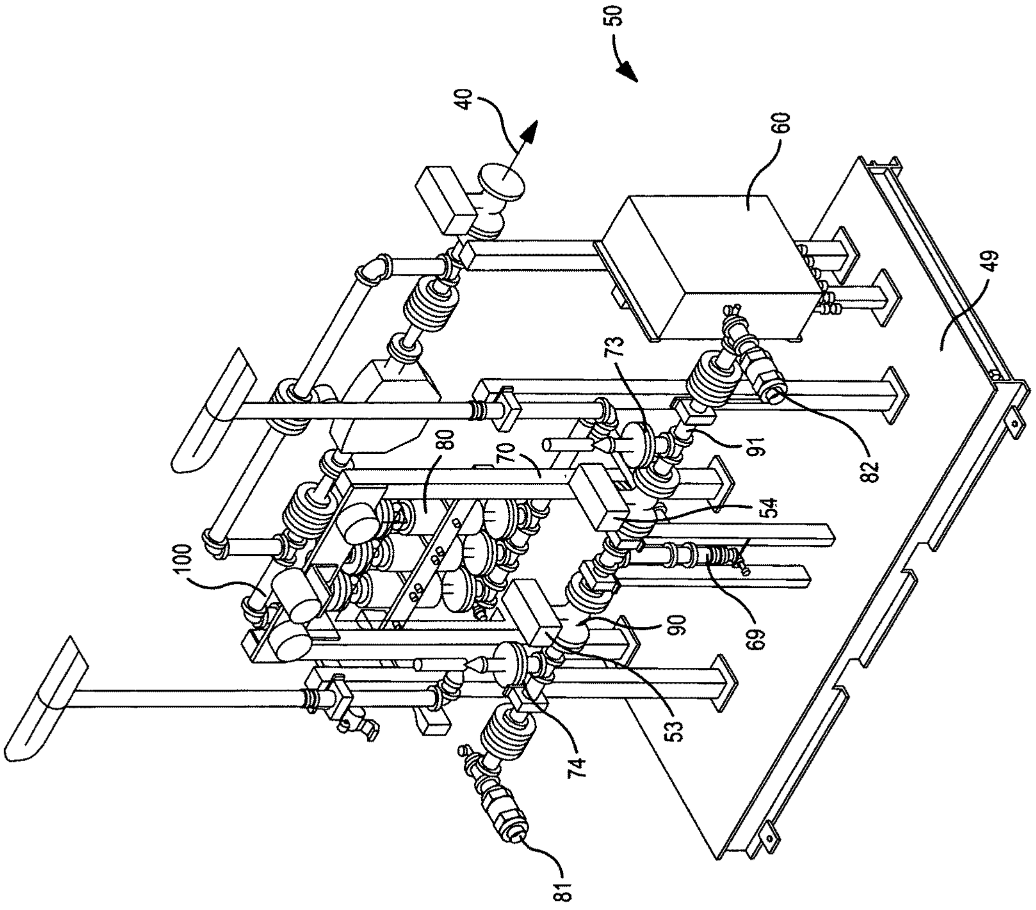
FIG. 3 illustrates the skid-mounted apparatus of FIG. 1 in perspective view showing the various components responsible for automatically controlling supply of acetylene from multiple acetylene sources, including trailers and reserve banks.

Second trailer 20 is shown in FIGS. 1 and 2 to be operably connected to the inlet 82 of skid-mounted apparatus 50 via connection 103 (FIG. 2 and FIG. 3). The acetylene flows from each of the second set of cylinders 21 loaded on the secondary trailer 20 and then into the inlet 82 of skid mounted apparatus 50. Pressure regulating device 52 regulates the pressure of acetylene from the source pressure in the manifolded cylinders 21 (e.g., about 250 psig at start-up) to the predetermined delivery pressure (e.g., preferably about 10-20 psig). Acetylene continues to flow through a hose 72 connected to the pressure regulating device 52 and thereafter the acetylene flows through check valve 73 and control valve 54. Acetylene enters a second side of the discharge manifold 70. The second side of the discharge manifold 70 is preferably a different conduit from the first side of the discharge manifold 70 into which acetylene from the first trailer 10 is supplied, as shown in FIG. 1. A pressure transducer/transmitter 87 measures the pressure of acetylene flowing into the discharge manifold 70; and then relays the signal as an input to the PLC 60. The PLC 60 may adjust the pressure if necessary by, for example, adjusting the pressure regulating device 52 to ensure the pressure of acetylene is within acceptable tolerance limits of the delivery pressure required at the customer point of use 40 (e.g., a delivery pressure of 15 psig, plus or minus 1 psig). Thereafter, the acetylene flows along a third flow leg 84 extending into the flash arrestors 80. The acetylene along third flow leg 84 is distributed into each flash arrestor 80. Pressure transducers (not shown) are situated on either side of the flash arrestors 80, and measure a differential pressure across the flash arrestors 80 that will shut down the process 1 if the differential pressure across the flash arrestors 80 reaches an established set point.

The acetylene emerges from the outlet of each of the flash arrestors 80, and then converges as a single stream that flows along the outlet flow leg 100. A pressure gauge 86 along the outlet flow leg 100 measures the pressure of the acetylene stream. FIG. 1 also shows a downstream pipeline pressure transmitter 88 which measures the pressure and relays a signal input to the PLC 60 to ensure the pressure of the acetylene stream is at the predetermined delivery pressure prior to the acetylene stream exiting the outlet leg 100 and exiting the skid 50 through the control valve 99; a subsequent mass flow meter 98; and then reaching the customer point of use 40. As with acetylene supply from the first trailer 10, although flow is not controlled, in accordance with an aspect of the present invention, the acetylene can be supplied from the second set of cylinders 20 at a substantially constant delivery pressure of 10-30 psig with a flow rate no greater than approximately 3000 standard cubic feet per hour (SCFH); preferably a substantially constant delivery pressure of 15-25 psig and a flow rate no greater than approximately 3000 SCFH; and more preferably 15 psig at a flow greater no greater than approximately 3000 SCFH.

As acetylene is supplied from the second set of cylinders 21 of the second trailer 20, the present invention maintains operable connection of the first trailer 10 to the process 1. This is contrary to conventional acetylene supply systems which disconnect the primary acetylene source from operational use for re-filling. Applicants have discovered that as acetylene is withdrawn from the first set of cylinders 11, there is a cooling effect whereby the temperature of the cylinders 11 is reduced. Without being bound by any theory, the cooling effect may occur to a degree where a portion of the acetylene liquefies. As a result of the liquefaction, the cylinder 11 pressure is reduced as hereinbefore described, and may be reduced further to a level that is below the predetermined minimum pressure limit (e.g., no more than about 80% decrease in initial source pressure of the first set of cylinders 11). Further, the present invention recognizes that as the temperature of the first set of cylinders 11 decreases, the solvent contained therewithin has a greater affinity for acetylene in the cylinder whereby it has a tendency to hold a larger volume of residual acetylene, thereby reducing the available capacity of acetylene vapor in the acetylene cylinder 11. Monitoring equipment and control systems will generally indicate to the user or operator a so-called "false positive" improperly indicating that the acetylene cylinders 11 are empty and need to be disengaged and removed from the process 1 and replaced with a new acetylene source. However, Applicants have discovered that the acetylene is not entirely depleted at this stage. In addition to this false positive, as mentioned hereinbefore, the continued supply of acetylene from the first set of cylinders 11 below a predetermined minimum pressure may cause undesirable entrainment of the solvent with the acetylene withdrawn from the cylinders 11, resulting in not only lower acetylene delivery pressure, but lower purity levels that may not meet applicable purity specifications at the customer point of use 40 for certain applications, thereby causing conventional supply systems to abort use of the primary trailer 10.

In accordance with the principles of the present invention, and contrary to conventional acetylene supply systems, the offline trailer 10 is not disengaged from the process 1; nor is the offline trailer 10 re-filled while in the "offline" or "standby" mode. Rather, the primary trailer 10 maintains operably connected to the skid-mounted apparatus 50 without re-filling for a certain duration, and with the status indicator 93 indicating an "offline" or "standby" mode. During this so-called temporary "offline" or "standby" mode, the first set of cylinders 11 will increase in temperature as a result of absorbing ambient heat and/or subject to other suitable heating means, thereby causing the residual liquefied acetylene to re-vaporize such that the partial pressure of acetylene in the first set of cylinders 11 is increased to a level sufficiently high enough to supply therefrom at the predetermined delivery pressure. The pressure in the first trailer 10 is greater than the delivery pressure. In one example, the pressure in the first trailer 10, while being temporarily offline, increases to greater than 50 psig, such as by way of example, about 59 to about 65 psig, preferably 60 to about 62 psig, and more preferably about 61 to about 65 psig, prior to the controller 60 switching from the second trailer 20 to the first trailer 10 and resuming supply from the first trailer 10. The pressure in the manifolded first set of cylinders 11 of the first trailer 10 is preferably monitored to determine when the pressure of acetylene has risen to above the delivery pressure, and in a more preferred embodiment, has risen to a pressure of at least 60 to about 62 psig. Depending on the heating means and number of cylinders 10, the duration that the first set of cylinders 11 may remain offline is approximately 1-75 hours or in another example 10-48 hours. In yet another example, the first set of cylinders is offline for 1-24 hours.

Figure 5:
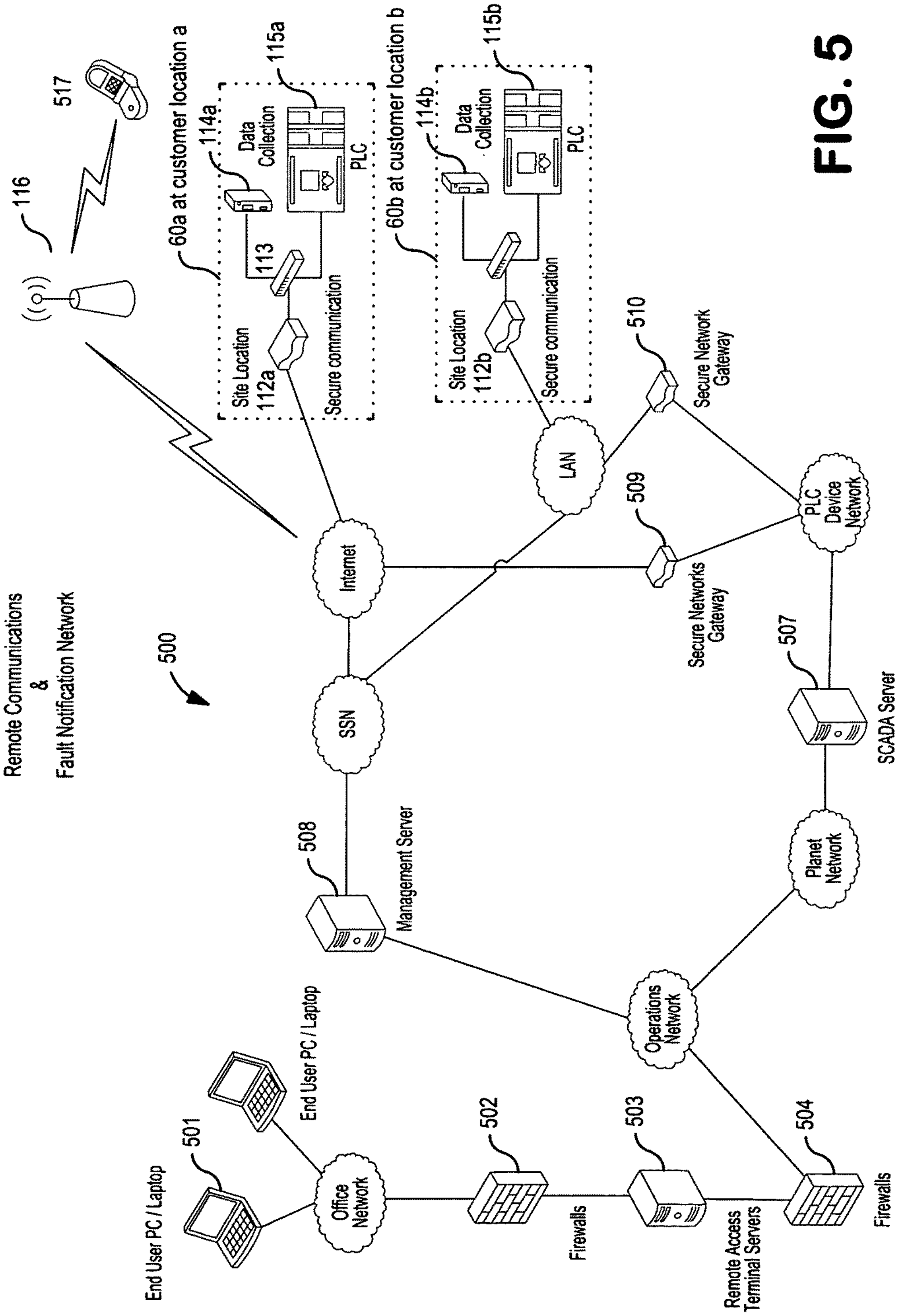
FIG. 5 shows a remote monitoring and alert notification system for the acetylene delivery process of FIG. 1 or FIG. 4.

When the source pressure in the cylinders 11 of the first trailer 10 has risen to a sufficient level to generate the required delivery pressure, PLC 60 reactivates supply from the first trailer 10. In one example, supply of acetylene from the first trailer 10 increases to greater than 20% of an initial source pressure, which can be greater than 50 psig. In this regard, PLC 60 direct signals to activate control valve 53 along the first flow leg 90 to be set to an open position. Valve 68 is shown as a manual valve and is set to the open position if previously set to the close position. Alternatively, valve 68 may remain in the open position to simplify operation by reducing the number of valves that must be reconfigured between open and close positions. At minimum, control valve 54 along the second flow leg 92 is set in the closed position to prevent flow from the second set of cylinders 21 loaded on the second trailer 20. In this manner, the second trailer 20 is oriented to "standby" or "offline" mode, and the PLC 60 relays signals to change status indicator 94 of the second trailer 20 to standby/offline mode along with appropriate alert remote notifications (FIG. 5). The first trailer 10 is re-activated to online mode, and PLC 60 relays signals to change status indicator 93 of the first trailer 10 to online mode along with appropriate alert remote notifications (FIG. 5).

With the appropriate valving for the first trailer 10 reconfigured to the open position, supply of acetylene reinitiates from the first set of cylinders 11. Specifically, acetylene flows from each of the first set of cylinders 11 of the first trailer 10 and into the inlet 81 of skid mounted apparatus 50. Acetylene continues to flow through the apparatus 50 and to customer point of use 40 as previously described.

The process 1 recognizes that acetylene is being supplied a second time from the first trailer 10. As such, when the source pressure of the first set of cylinders 11 has reduced to a final pressure (e.g., less than delivery pressure of, by way of example, 15 psig), the cylinders 11 are considered depleted, at which point the PLC 60 send signals to abort supply from the first set of cylinders 11 and configure at least control valve 53 to the off position. Valves 68 and 88 can remain in the open position or also be set to the closed position.

Trailer 10 is disconnected from connection 102 to allow the trailer 10 to be removed from the inlet 81 of skid mounted apparatus 50. Status indicator 93 for the first trailer 10 may indicate "depleted" or "permanently depleted" and further indicate that a new trailer is required. Alert remote notifications to this effect are also relayed (FIG. 5). At this point in the process 1, trailer 10 can be replaced with a new trailer with adequate levels of acetylene, and the new trailer is operably connected to the skid 50. Alternatively, the second trailer 20 can become the primary trailer and a new secondary trailer can be operably connected to the skid mounted apparatus 50 in place of the first trailer 10 that has been depleted. The depleted first trailer 10 can be refilled at a suitable acetylene filling station, as known in the art.

PLC 60 may reconfigure the valves along second flow leg 91 to allow flow to resume from the second trailer 20 such that it becomes the new primary trailer, while the previously depleted trailer 10 is disconnected from the skid mounted apparatus 50 and re-filled or replaced with a new trailer, to ensure uninterrupted flow is provided to the customer point of use 40 at substantially constant delivery pressure. Alternatively, PLC 60 may activate another trailer to serve as the primary trailer and the second trailer 20 continues to function as a secondary trailer as defined hereinbefore. Status indicators 93 and 94 are updated accordingly. Remote notifications can also be sent via a cellular network or secure internet connection to one or more remote units (e.g., cell phone, pager or computer) to alert customers, users and/or operators that the primary trailer 10 has been depleted and needs to be disconnected from the skid mounted apparatus 50 and replaced with a new acetylene source.

The present invention offers numerous benefits unprecedented within the context of acetylene supply systems. For example, the ability to regulate delivery pressure and monitor when switchover from a primary acetylene source to a second acetylene source occurs can prevent the temperature of the cylinder from reducing to a level where unacceptable amounts of solvent begin to be entrained with the withdrawn acetylene, thereby reducing the purity of the acetylene to the customer point of use 40. Applicants have discovered that lower temperature increases solvent affinity for acetylene and increases the tendency for solvent to be entrained with the acetylene that is withdrawn from its respective acetylene source. The present invention can minimize, reduce or eliminate the amount of solvent that is entrained with the acetylene that is withdrawn from the first set of cylinders 11, by switching to a secondary acetylene source when the pressure in the primary acetylene source is reduced to a predetermined minimum pressure. The predetermined minimum pressure defines the minimum pressure to be delivered to a customer point of use 40 before solvent impurities are introduced. In a preferred embodiment, the minimum pressure level is no more than 80% of the initial pressure. Specifically, when the pressure of the primary acetylene source is reduced from 250 psig to 50 psig, supply form the primary acetylene source stops, and the supply resumes from a secondary acetylene source, thereby avoiding solvent entrainment into the acetylene that is supplied to the customer point of use 40. As such, the purity level of acetylene is substantially maintained; the need to replenish the first set of cylinders 11 to the required solvent level is significantly reduced; and the utilization of the primary acetylene source 10 is increased in comparison to conventional acetylene supply systems.

As an additional means to ensure purity of the supplied acetylene, the skid-mounted apparatus 50 includes a condensate leg 69 for removal of moisture and/or other contaminants that may inadvertently accumulate in the conduits. The present invention recognizes that moisture in particular can accumulate in the flow legs 90 and/or 91 despite the flow legs 90 and 91 being purged with nitrogen prior to acetylene supply, during acetylene supply; and after acetylene supply from one of the trailers 10 and 20. Alternatively or in addition thereto, the impurities can arise if the connections to the trailers 10 and 20 are not clean or when the connections 81 and 82 to the trailers 10 and 20, respectively, are disconnected and re-connected to the skid-mounted apparatus 50. As such, the condensate leg 69 can be periodically opened to remove any moisture or contaminants entrapped within the process 1 of FIG. 1.

The portability of the skid-mounted apparatus 50 can be better appreciated by FIGS. 2 and 3. The portability of the skid-mounted apparatus 50 avoids the need to assemble on-site the extensive conduit, valving, and flash arrestors, PLC and data acquisition system which is required for optimizing the delivery of acetylene from multiple acetylene sources. FIG. 2 shows a top-down view of the skid mounted apparatus 50 of FIG. 1 whereby the required components are self-contained and pre-assembled as a unitary skid-mounted or portable apparatus 50. Acetylene gas flow through the skid-mounted apparatus 50 is indicated by the various arrows. The components (i.e., the conduit, PLC, first and second flow legs, control valves, manual valves, status indicators, nitrogen cylinders, etc.) of skid mounted apparatus 50 in FIG. 2 are intended to correspond to those shown in FIG. 1. FIG. 2 shows a majority of the components shown and described in FIG. 1 to be mounted directly onto the platform 49. However, for purposes of clarity, some of the components shown in FIG. 1 have been omitted from FIG. 2. One end of the skid-mounted apparatus 50 is operably connected by hose 71 to primary trailer 10 via connection 102; and the other end of the skid mounted apparatus 50 is operably connected by hose 72 to the secondary trailer 20 via connection 103. FIG. 2 shows that the pressure regulator 52 situated along the connection 102 and the pressure regulator 53 situated along the connection 103. However, it should be understood that the pressure regulators 52 and 53 can be situated anywhere, including connected directly or indirectly onto the platform 49.

Figure 4:
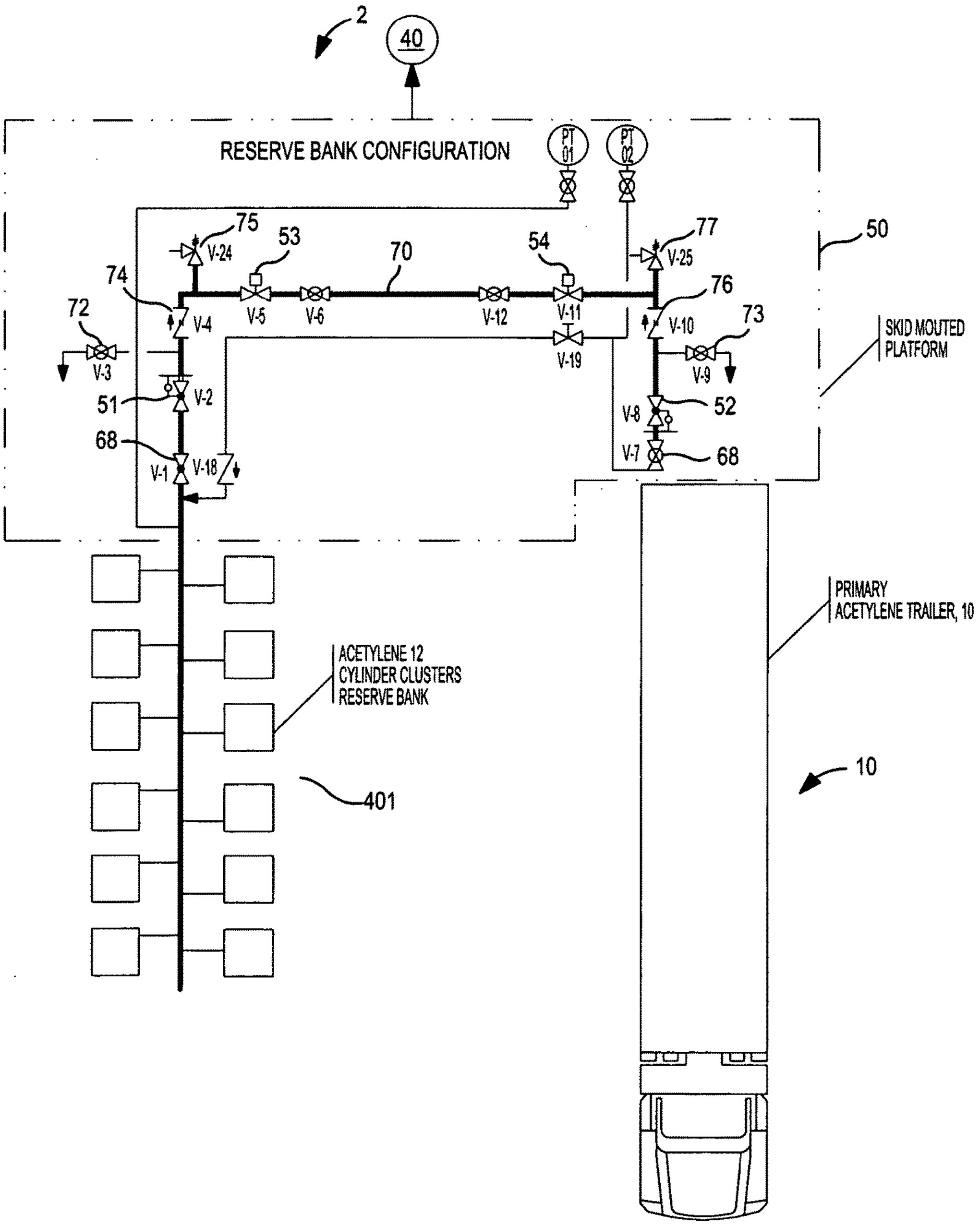
FIG. 4 illustrates a process schematic that incorporates the skid-mounted apparatus of FIG. 1 for an alternative switchover methodology between an acetylene trailer and a reserve bank of acetylene at substantially constant delivery pressure to a customer point of use in accordance with the principles of the present invention.

FIG. 3 illustrates a perspective view of the skid-mounted apparatus 50 of FIG. 1 (indicated by dotted line in FIG. 1) showing the various components responsible for automatically controlling supply of acetylene from multiple acetylene sources, including trailers and reserve banks (FIG. 4). The compactness of the skid-mounted apparatus 50 provides a modular "plug and operate" capability for delivery of acetylene from multiple acetylene sources in an optimized manner at substantially constant delivery pressure, while increasing utilization of acetylene from the trailers. In a preferred embodiment, the modular platform of the skid-mounted apparatus 50 is characterized by a footprint having an area of no more than about 32 ft2. The modularity allows for ease of transportability to a customer site with convenient plug and operation to the acetylene sources along one side of the apparatus 50 at inlets 81 and 82 and plug and operation to the customer point of use 40 along another side of the apparatus 50.

FIG. 4 shows an alternative process 2 whereby the secondary trailer 20 of FIG. 1 is replaced with a reserve bank 401, which is shown in FIG. 4 as a cluster of 12 interconnected cylinders. A primary acetylene trailer 10 is shown in FIG. 4. The primary acetylene trailer 10 includes a first set of interconnected cylinders 11 that supplies acetylene in a manner similar to the way shown and described with the primary trailer 10 of FIG. 1 and incorporates similar components as shown in FIG. 1, including the skid-mounted apparatus 50. For purposes of clarity, some of the components (e.g., valving, control box, flow legs and conduit) shown in FIG. 1 have been intentionally omitted from FIG. 4. In operation, the process 2 is similar to that of FIG. 1. The difference in the process 2 of FIG. 4 occurs when the source pressure in the primary acetylene trailer 10 reduces to a predetermined minimum pressure (preferably, no more than 80% of the initial source pressure), the supply of acetylene switches from the primary trailer 10 to the reserve bank 401 instead of a secondary trailer 20. The reserve bank 401 is a cluster of a certain number of cylinders permanently deployed at the customer site. FIG. 4 shows a cluster of 12 cylinders. However, it should be understood that any number of cylinders can be utilized to form the reserve bank 401. Preferably, the reserve bank 401 is designed to have enough capacity to provide acetylene flow at the required delivery pressure until a new primary trailer 10 is delivered to the customer site and connected to the skid-mounted apparatus 50. In one example, supply from the reserve bank can last 2-3 days; in other example, the reserve bank 401 is configured to provide supply for 1 week or more. In a preferred embodiment, the reserve bank 401 is configured to provide a 2-3 week supply of acetylene. The process 4 also can include remote alert notifications when automatic switchover occurs from the primary trailer 10 to the reserve bank 401. Other remote alert notifications as described in FIG. 1 can also occur.

When the new primary acetylene trailer 10 arrives to the customer site 40, it is connected as shown in FIG. 4 to the apparatus 50 and the reserve bank 401. Suitable valving and conduit extends between the new primary acetylene trailer 10 and the reserve bank 401. When the new primary acetylene trailer 10 is connected as shown in FIG. 4, it initially provides flow to the reserve bank 401 until all the cylinder clusters of the reserve bank 401 have been re-filled. Specifically, the reserve bank 401 is automatically and continuously filled by the primary trailer 10, such as, for example, from a port on the upstream side of the pressure regulator of the primary trailer 10. Other suitable means for establishing fluid connectivity between the primary trailer 10 and the reserve bank 401 can be employed as would be known and recognized in the art. After having re-filled the cylinder clusters of reserve bank 401, the primary acetylene trailer 10 can resume supply of acetylene, as has been previously described. Because the depleted primary trailer 10 is replaced within 1-2 days of reaching the predetermined minimum pressure, the reserve bank 401 has sufficient capacity during this time period, and therefore is never depleted. In this manner, the reserve bank 401 can permanently be maintained at the customer site 40 to provide back-up supply of acetylene while a new acetylene trailer is transported to the customer site and operably connected to the process 4.

In an alternative embodiment, the depleted primary trailer 10 can remain connected to the process 2 and be allowed to absorb heat and increase in temperature as described hereinbefore in connection with the embodiment of FIG. 1. In such a scenario, acetylene supply would switch back from the reserve bank 401 to the primary trailer 10, thereby increasing utilization of the primary trailer 10. In one example, supply of acetylene is resumed from the primary trailer 10 when the pressure of the primary trailer 10 increases to greater than 20% of an initial source pressure of the primary trailer (e.g., greater than 50 psig). Only when the source pressure has fallen a second time to the predetermined minimum pressure would the primary trailer 10 be considered permanently depleted, at which point flow from reserve bank 401 would resume until a new acetylene trailer 10 is transported to the customer site and connected to the process 2. Upon removal of the permanently depleted trailer 10 and connection of the new trailer to serve as the new primary trailer 10, the reserve bank 401 is replenished by the new primary trailer 10, before supply from the new primary trailer 10 to the customer point of use 40 is re-initiated. Because this mode of operation requires longer usage from the reserve bank 401, the reserve bank 401 must be capable of providing supply for a longer duration in comparison to the mode of operation in which the primary trailer 10 is removed and replaced upon its pressure falling to a predetermined minimum pressure for the first time (i.e., and not given time to heat up and increase to a sufficient pressure level capable of supplying acetylene a second time at the desired delivery pressure to the customer point of use 40, as described with reference to the process 1 of FIG. 1). A longer-lasting supply from the reserve bank 401 prior to being replenished may require a higher number of cylinders clustered together to form the bank 401, and/or the use of larger cylinders or larger bulk vessels.

In accordance with another embodiment, the present invention is configured to provide remote alert and fault notifications to registered remote devices 517, as shown in the communication infrastructure and system 500 of FIG. 5. The system 500 has the ability to remotely transmit alarms or shutdowns as it manages, monitors and stores process and operational data for multiple acetylene processes carried out in FIG. 1 and FIG. 4 at the multiple customer sites. Each customer site is provided with the supply of acetylene in accordance with the principles of the present invention of FIG. 1 or 4 which have been in detail hereinbefore. FIG. 5 shows multiple control systems are provided as part of the control process. Control system 60*a* is situated at acetylene customer location “a”. Control system 60*b* is situated at acetylene customer location “b”. Other control systems at various customer sites can also be provided. Each control system 60*a* and 60*b* includes a PLC 115*a* and 115*b*, respectively (as described in connection with the embodiment of FIG. 1), and data collection device 114*a* and 114*b*, respectively, and a secured device 112*a* and 112*b*, respectively.

The PLC 115*a* at customer location “a” is programmed to look for an alarm or shutdown of its respective acetylene process 1 or 2. Similarly, the PLC 115*b* at customer location “b” looks for an alarm or shutdown of its respective acetylene process 1 or 2. When the PLC 115*a* and 115*b* finds a fault, the process of notification begins whereby the respective PLC’s 115*a* and 115*b* send a signal via the internet or local area network (LAN) to a Supervisory Data Control and Data Acquisition (SCADA) Server 507. The SCADA server 507 is a supervisory control system that collects all the information, including all the alarms and shutdowns at each customer site “a” and “b” from the multiple different on-site acetylene supply processes 1 and 2. In order words, the SCADA server 507 is a warehouse of information and monitors all the alarms for all the different systems and processes 1 and 2 (FIGS. 1 and 4) that are deployed at multiple customer sites. For example, the various PLC’s 60*a*/60*b* at their respective customer sites receive and gather data from their respective pressure transmitters 57*a*/57*b* and then communicate such data to the SCADA server 507. Each of the pressure transmitters 57 at the various customer sites is registered with the SCADA server 507. The SCADA server 507 collects all the pressure information from the remoter PLC’s 60*a/b* through a cyber-secure network 509/510 thereby enabling the information to be securely transferred to a central location where the SCADA server 507 is located. One of the secure networks goes through a LAN network and the other secure network goes thru the Internet (cloud). As such, in this aspect of the present invention, there can be primarily two ways by which information is remotely transmitted from the on-site customer location 60*a* and 60*b* to the SCADA server 507, thereby allowing the present invention to implement a completely autonomous switchover acetylene supply system.

If there is a fault (for example, an overpressure situation during delivery where the delivery pressure is 5 psig or higher than set point; the flash arrestors absorb a flash; or a clog exists in the process 1 or 4 that creates a sudden pressure rise above a certain safety threshold level), the PLC 115*a* and/or 115*b* at that particular site where the fault occurs will register an alarm at the customer location 60*a/b*, such as by way of the status indicators 93 and 94 (FIG. 1). The SCADA 107 also transmits specific alerts to remote devices 517, such as cell phones or pagers as shown in FIG. 5.

In addition to such faults, the communication infrastructure 500 of FIG. 5 can send out an alarm that the primary trailer 10 is temporary depleted or permanently empty as described hereinbefore. The alarm is sent from the respective PLC 60*a/b* located at that particular customer site 60*a/b*. The alarm can be transmitted via a communications network such as the internet or LAN to the SCADA Server 507, which is generally based remotely and located away from the customer sites 60*a/b*. By way of example, when the pressure of the first set of cylinders 11 of first trailer 10 at customer site 60*a* (i.e., plant a) has reduced to 50 psig, the PLC 60*a* at plant a will transmit a signal to the status indicators 93 and 94 at site a; transmit a signal back to the SCADA Server 507 by either the Internet or LAN through its respective secured network, as shown in FIG. 5, which can then send remote alert notifications to remote devices 517.

FIG. 5 also shows that an end-user 501 can dial into the operations. A remote access terminal server 503 acts as a firewall that allows end users 501 with proper security and recognized passwords to log onto the communication infrastructure and system 500 to enable the access of the warehouse of certain information at the SCADA sever 507. As a further means for security, the Secured Devices 112*a/b* only allows secured (encrypted) communications to occur from its corresponding customer site 60*a* or 60*b* to the SCADA server 507. Each of the Secured Devices 112 *a/b* at its respective customer site 60*a* or 60*b* has a specific IP address that is only recognized by the SCADA server 107. In this regard, when an end-user 501 logs onto the Office Network, and then access the Terminal Server and looks at the SCADA server 507, the SCADA server 507 goes out to the corresponding Secured Devices 112*a/b* that only that particular end-user 501 is linked with and recognizes is present at that customer site 60*a/b* that the registered end-user 501 can access.

While it has been shown and described what is considered to be certain embodiments of the invention, it will, of course, be understood that various modifications and changes in form or detail can readily be made without departing from the spirit and scope of the invention. It is, therefore, intended that this invention not be limited to the exact form and detail herein shown and described, nor to anything less than the whole of the invention herein disclosed and hereinafter claimed. For example, suitable modifications for carrying out the process 1 and 4 for delivery of acetylene are contemplated. In particular, although the various embodiments have been described with regards to cylinders, it should be understood that any type of container for acetylene source can used, including, by way of example and not intending to be limiting, bulk vessels and ISO containers. Further, although the modularity of the apparatus 50 has been defined as skid-mounted, it should be understood that any other suitable portable apparatus or platform 49 may be utilized, having modularity and compactness. Still further, various components may be assembled in close proximity to the skid-mounted apparatus 50. For example, although the PLC 60 has been shown and described in the embodiments as located onto the platform 49 of the skid-mounted apparatus 50 for purposes of conforming to certain regulatory approvals, the PLC 60 and associated control panel can be configured so as to be, one example, 5-15 ft away from the edge of platform 49 when deployed in a nonclassified area. Further, although the embodiments have utilized pressure as the basis for switching between a primary source and a secondary source, it should be understood that other manipulated variables may be employed to serve as the basis for switchover, including temperature and flow rate.

The invention claimed is:

1. A system for maximizing utilization of supply of acetylene at a substantially constant delivery pressure to a point of use, comprising:

a first acetylene source and a second acetylene source;

the first acetylene source characterized by an initial source pressure comprising a first set of cylinders manifolded together to provide the supply of acetylene at the substantially constant delivery pressure;

the second acetylene source comprising a second set of cylinders manifolded together to provide the supply of acetylene at the substantially constant pressure;

each of the first set and the second set of cylinders comprising a porous filler with solvent selected from the group consisting of dimethylformaldehyde (DMF), acetone and N-methylpyrrolidone (NMP) into which pressurized acetylene is absorbed;

the first acetylene source and the second acetylene source operably connected to a portable apparatus, said portable apparatus, comprising:

a discharge manifold in fluid communication to the first acetylene source and the second acetylene source; and a controller to maximize the supply of acetylene from the first acetylene source, the controller having as an input, the delivery pressure of the acetylene, and the controller configured to switch supply to the second acetylene source when the controller determines the initial source pressure from the first acetylene source decreases by no more than 80% of the initial source pressure, and further wherein the controller is configured to divert from the second acetylene source back to the first acetylene source to resume supply of acetylene from the first acetylene source when determining the pressure of the first acetylene source is greater than the delivery pressure.

2. The system of claim 1, wherein said first acetylene source resumes supply of acetylene from the first acetylene source when the pressure of the first acetylene source is about 24-26% of the initial source pressure of the first acetylene source.

3. The system of claim 1, wherein the delivery pressure is from about 10 to about 25 psig.

4. The system of claim 1, wherein the discharge manifold is situated between the first and the second acetylene sources and the point of use.

5. The system of claim 1, wherein the discharge manifold and the controller are operably connected onto the portable apparatus.

6. The system of claim 1, wherein the portable apparatus further comprises a pressure regulating device to down regulate from a source pressure of the first acetylene source to the substantially constant delivery pressure.

7. The system of claim 1, wherein the controller is configured to automatically notify a remote user(s) when the first acetylene source has attained a permanently or temporarily depleted status, thereby prompting replacement of said first acetylene source with a new acetylene source.

8. A portable on-site apparatus configured for automatically controlling supply of acetylene from multiple acetylene trailers, said portable-onsite apparatus comprising:

a discharge manifold, said manifold adapted to interconnect to at least a first acetylene source and a second acetylene source to allow the supply of acetylene at a substantially constant delivery pressure to a point of use from either the first acetylene source or the second acetylene source;

a controller to maximize the supply of the acetylene from the first acetylene source, the controller having as an input, the delivery pressure of the acetylene, and the controller configured to switch supply from the first acetylene source to the second acetylene source when the controller determines a pressure of the first acetylene source decreases by no greater than 80% of an initial source pressure of the first acetylene source, and further wherein the controller is configured to divert from the second acetylene source to the first acetylene source to resume supply of acetylene from the first acetylene source when determining the pressure of the first acetylene source is sufficient to supply the acetylene at the substantially constant delivery pressure;

a modular platform characterized by a footprint having an area of no more than about 50 ft2, said modular platform configured to receive said controller and said discharge manifold.

9. The portable on-site apparatus of claim 8, wherein the manifold further comprises a control valve to direct the flow from one of the first and the second acetylene sources to the manifold.

10. The portable on-site apparatus of claim 8, wherein the first acetylene source resumes supply of acetylene from the first acetylene source when the pressure of the first acetylene source increases to about 24-26% of the initial source pressure of the first acetylene source.

11. The portable on site apparatus of claim 8, further comprising a first status indicator for displaying a status of said first acetylene source, and a second status indicator for displaying a status of said second acetylene source.

12. The portable on site apparatus of claim 8, further comprising a first control valve for activating supply of acetylene from the first acetylene source, and a second control valve for activating supply of acetylene from the second acetylene source.

13. The portable on-site apparatus of claim 12, further comprising:

a first pressure regulating device positioned along a first flow leg operably connected to a first acetylene source, said first pressure regulating device regulating the pressure of acetylene supplied from the first acetylene source from a source pressure in the first acetylene source to a delivery pressure, and a second pressure regulating device positioned along a second flow leg operably connected to a second acetylene source; said second pressure regulating device regulating the pressure of acetylene supplied from the second acetylene source from a source pressure in the second acetylene source to the delivery pressure.

14. The portable on-site apparatus of claim 10, further defined by a flow network, said flow network comprising:

a first flow leg extending between the first acetylene source and the discharge manifold;

a second flow leg extending between the second acetylene source and the discharge manifold;

an outlet leg extending between the discharge manifold and the point of use.

15. The portable on-site apparatus of claim 14, further comprising a pressure gauge and control valve positioned on the outlet leg.

16. The portable on-site apparatus of claim 10, wherein the second acetylene source is a reserve bank permanently deployed at a customer site.

* * * * *